(12) United States Patent
Roser

(10) Patent No.: US 8,221,250 B2
(45) Date of Patent: Jul. 17, 2012

(54) DAMPER UNIT FOR A SHAFT

(75) Inventor: Tobias Roser, Friesenheim (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/105,651

(22) Filed: May 11, 2011

(65) Prior Publication Data

US 2011/0212787 A1 Sep. 1, 2011

Related U.S. Application Data

(63) Continuation of application No. PCT/DE2009/001588, filed on Nov. 11, 2009.

(30) Foreign Application Priority Data

Nov. 12, 2008 (DE) .................... 10 2008 056 872

(51) Int. Cl.
*F16D 3/227* (2006.01)

(52) U.S. Cl. .................... 464/161; 464/167; 464/169

(58) Field of Classification Search .................. 464/160, 464/161, 167, 169, 144, 145, 146, 906
See application file for complete search history.

(56) References Cited

U.S. PATENT DOCUMENTS

| | | | |
|---|---|---|---|
| 2,890,594 A | | 6/1959 | Galonska |
| 2,979,147 A | * | 4/1961 | Naumann |
| 3,807,243 A | * | 4/1974 | Yada ................... 464/160 X |
| 3,908,401 A | * | 9/1975 | Harbage ................... 464/160 X |
| 4,344,305 A | * | 8/1982 | Holmes ................... 464/169 |
| 4,599,019 A | * | 7/1986 | Ueberall |
| 4,913,681 A | * | 4/1990 | Green ................... 464/161 X |
| 5,098,343 A | * | 3/1992 | Tysver et al. ................. 464/169 |
| 5,464,229 A | * | 11/1995 | Salpaka |
| 5,803,030 A | * | 9/1998 | Cole ................... 464/160 |
| 6,192,776 B1 | * | 2/2001 | Leitner |
| 6,213,071 B1 | * | 4/2001 | Lancefield et al. ....... 464/160 X |
| 6,672,967 B2 | * | 1/2004 | Castellon ................... 464/169 |
| 6,908,394 B2 | * | 6/2005 | Amborn ................... 464/167 |
| 2005/0049052 A1 | | 3/2005 | Welschof |
| 2011/0159970 A1 | * | 6/2011 | Okabe ................... 464/169 |
| 2011/0198126 A1 | * | 8/2011 | Swietlik et al. |

FOREIGN PATENT DOCUMENTS

DE 611 129 C 3/1935
(Continued)

OTHER PUBLICATIONS

International Search Report including English translation dated Apr. 16, 2010 (Six (6) pages).

(Continued)

*Primary Examiner* — Gregory Binda
*Assistant Examiner* — Matthieu Setliff
(74) *Attorney, Agent, or Firm* — Crowell & Moring LLP

(57) ABSTRACT

A damper unit (1) composed of two parts (2, 3) which are connected to rotate with one another and between which an axially elastic element (7) is disposed. Such damper units are used particularly for axial damping and for compensating slight axial misalignments of shafts in drive trains. To improve such damper units, particularly with respect to their external diameters, the axially acting energy storage device is compressed by a rotational movement produced by threads upon axial loading of the two parts.

11 Claims, 6 Drawing Sheets

FOREIGN PATENT DOCUMENTS

| | | |
|---|---|---|
| DE | 8 628 437 U1 | 12/1986 |
| DE | 93 13 417 U1 | 11/1993 |
| DE | 195 25 271 A1 | 1/1997 |
| GB | 937 857 A | 9/1963 |
| GB | 2 273 961 A | 7/1994 |
| JP | 62098030 A  * | 5/1987 |

OTHER PUBLICATIONS

Office Action dated Jul. 21, 2009 in DE 10 2008 056 872.4 (Three (3) pages).

* cited by examiner

DAMPER UNIT FOR A SHAFT

CROSS REFERENCE TO RELATED APPLICATIONS

This application is a continuation of international patent application no. PCT/DE2009/001588, filed Nov. 11, 2009 designating the United States of America and published in German on May 20, 2010 as WO 2010/054635, the entire disclosure of which is incorporated herein by reference. Priority is claimed based on Federal Republic of Germany patent application no. DE 10 2008 056 872.4, filed Nov. 12, 2008, which likewise is incorporated by reference in its entirety.

BACKGROUND OF THE INVENTION

The invention relates to a damper unit, particularly for a drive train of a motor vehicle, which damper unit comprises two components connected to each other for co-rotation, and an axially elastic element disposed in between them.

Damper units of the foregoing type are used, for example, for damping axial vibrations and for compensating for angular misalignments between two shafts. One variant of such damper units has become become known as Hardy disks or flexible disks. DE 9313417 U1 discloses a corresponding construction of the such a damper unit. In this case two radially extended flange components disposed on a shaft component or another component which transfer the rotation of the shaft are rotationally connected over the circumference thereof to an elastic disk made, for example, of a rubber/steel netting mesh. The elastic disk serves as a damper for absorbing torsional vibrations and compensating small angular misalignments between the components associated with the flange components. In order to be able to transfer the required torque with a damping unit of this type, the diameter of the elastic disk must be dimensioned in accordance with the circumferential forces which act upon the elastic disk so that it is necessary to provide the damper unit with a diameter that is many times the diameter of the shaft and allow for the damper unit of increased diameter in the corresponding installation space. Axial length compensation is not possible with such types of damper units. Two shaft sections are connected to each other by helical gears, so as to be displaceable, for example, as disclosed in the patent specification DE 611 129. Similarly, published German patent application no. DE 195 25 271 A1 also describes a connection of shaft components, in which a sliding displacement of the shaft components relative to each other is likewise facilitated via a thread.

SUMMARY OF THE INVENTION

It is therefore an object of the present invention to provide a damper unit for a shaft, which damper unit has a smaller diameter.

Another object of the invention is to provide a small diameter damper unit for jointed shaft, particularly a longitudinal drive shaft and/or lateral drive shaft in a drive train of a motor vehicle.

A further object is to provide a smaller diameter damper unit which enables length compensation of a shaft.

These and other objects are achieved in accordance with the present invention by providing a damper unit disposed particularly in a drive train of a motor vehicle between two components connected to each other for co-rotation, the two components being axially displaceable, at least to a limited extent, relative to each other and an axially elastic element being disposed between the two components, which elastic element is loaded or compressed by a thread-like rotational movement of the two components relative to each other. By virtue of a damper unit constructed in this way, the axially elastic element is loaded in the axial and not in the circumferential direction in order to transfer the required torque. As a result, the damper unit can be constructed with a substantially smaller diameter than flexible disks, for example, with a diameter that is at the most twice, preferably only one and a half times the diameter of a shaft or two shaft sections, on or between which the damper unit is mounted, respectively. Such a damper unit is also able to provide length compensation since an axial displacement is achieved by the threads due to a slight rotation of the shaft when the two components are subjected to axial load. Due to the transfer of torque, a driven shaft or two shaft sections comprising an interposed damper unit are therefore always pre-stressed axially. In the case of a reversal of torque direction, it shall be understood that the axial length of the damper unit is limited by the corresponding installation situation. Apart from being suitable for the mounting of two components between two shaft sections (for example, parts of a multi-part drive shaft), the proposed damper unit is also well-suited for connecting an end of a shaft to a further component such as a differential or a swivel joint, for example, for driving a wheel via a lateral drive shaft. It should be understood that a small angular misalignment of two shafts can also be compensated by providing appropriate play between the threads of the two components.

A first one of the two components of the damper unit comprises a sleeve-like molded recess in which the axially elastic element is received and with which the second of the two components engages via an axial projection. A partial thread is arranged between the molded recess and the projection. A slight thread-like rotation of the molded recess and the projection compresses the axially elastic element in the axial direction. In one embodiment, the pitch of the partial thread is designed such that the axially covered distance is large relative to the torsion angle in that the axial component of the partial thread is much larger than the circumferential component. As a result, the partial thread in one embodiment comprises less than one thread turn. This means that the pitch of the partial thread is less than one, preferably less than a quarter of the circumference. Depending on the required elasticity and the consequently selected elasticity of the axially elastic element, the maximum torsion angle of the two components relative to each other can range, for example, from a few degrees to 90°. Longitudinal grooves having a circumferential component are provided in the axial projection and the sleeve-shaped molded recess so as to be distributed around the respective circumferences thereof. At least one ball is mounted in each of the mutually opposing longitudinal grooves, which thus form pairs. The balls disposed in the mutually opposing longitudinal grooves enable a rolling movement between the two components connected to each other for co-rotation. In one embodiment, the balls are retained in a ball cage. Such a rolling movement can be achieved in a simpler, and thus more low-force and low-loss manner as compared to the prior art. In this way a reduced degree of wear is also achieved.

In a simple case, the partial thread may comprise a standard screw mechanism comprising mutually engaging screw-thread sections. It has proved advantageous if the partial thread is formed of a ball-screw segment.

An additional preferred embodiment of the damper unit can comprise an axial projection that comprises a central opening, in which a receiving component comprising a radially expanded rim is mounted, the axially elastic element being received between an end face of the axial projection and the rim, and the rim being supported axially against an end face of the sleeve-like molded recess. In this way, the axially elastic element can be annular in shape and at the same time centered inwardly in the radial direction. The bearing surfaces of the two components may be in the form of axial supporting surfaces, and the sleeve-shaped molded recess may be produced, for example, by a forming process or by machining. To better fit the bearing surfaces of the flange of the receiving component and the sleeve-shaped molded recess, the bearing surfaces can be conical in shape. In order to prevent friction between the receiving component and the axial projection, a small play can be provided between these two components. Alternatively or additionally, the surfaces coming into contact with each other can be machined, for example, ground and/or provided with lubricants. An intermediate disk or washer can be disposed between the end-face contact surface of the axial projection and the axially elastic element. The material used and treatment of the intermediate washer can be selected independently of the material and treatment, such as hardening, required for the axial projection, and should be chosen to satisfy the requirements for loading the axially elastic element. Furthermore, the intermediate washer can be provided for rotationally decoupling the axially elastic element from the axial projection when, for example, the friction between the axially elastic element and the intermediate washer is selected to be greater than the friction between the axial projection and the intermediate washer.

Depending on the application for which the damper unit is used, the axially elastic element may be disposed between the two components in a pre-stressed form or with play. For example, an annular component made of an elastic material such as rubber, reinforced rubber or plastic and mixtures of the same known as composites or mixtures with other inorganic substances can be used as the axially elastic element. An annular component of this type can have a volume in the unstressed or merely pre-stressed state of the two components that is smaller than an installation volume or operating volume. For example, a substantially cylindrical operating volume can be provided, whereby the annular component exhibits a substantially circular cross-section. By virtue of the axial load, displacement forces which depend on the axial compression distance can thus be provided in accordance with the designed volume for displacing the elastic annular component so that performance characteristics of the damper unit that vary throughout a range of geometric relationships can be achieved, particularly in conjunction with a varying design of the pitch of the partial thread. For example, after the operating volume, which decreases with increasing axial force, has been completely filled by the compressed damper element, a particularly rigid second-stage characteristic and thus a hard, but not metallic, stop can be achieved after the elastically damped axial distance is used up.

Alternatively or additionally, a spring unit made of steel or comparable materials can be used as the axially elastic element. This spring unit can be at least in the form of a helical compression spring or a coil-spring set comprising helical springs disposed radially one inside the other or disposed serially, as a result of which a damper unit having multi-stage characteristics unit can be realized. In the case of springs that are fully compressed, a hard stop can likewise be achieved. Furthermore, the spring unit can comprise a set of axially arranged plate springs or diaphragm springs. Corresponding characteristics of the damper unit can be realized by selecting diaphragm springs with appropriate characteristic performance curves.

The object of the invention is further achieved by providing a jointed shaft, particularly a longitudinal drive shaft or a lateral drive shaft in the drive train of a motor vehicle, in which at least one axially elastic element is mounted between two shaft components, or on at least one end of the shaft, and/or between one end and a subsequent constant velocity joint or the like. Alternatively or additionally, provision is made for a damper unit according to any one of the preceding embodiments.

BRIEF DESCRIPTION OF THE DRAWINGS

The invention will be explained in further detail hereinafter with reference to illustrative embodiments shown in the accompanying drawing figures, in which.

DETAILED DESCRIPTION OF PREFERRED EMBODIMENTS

Figure 1:
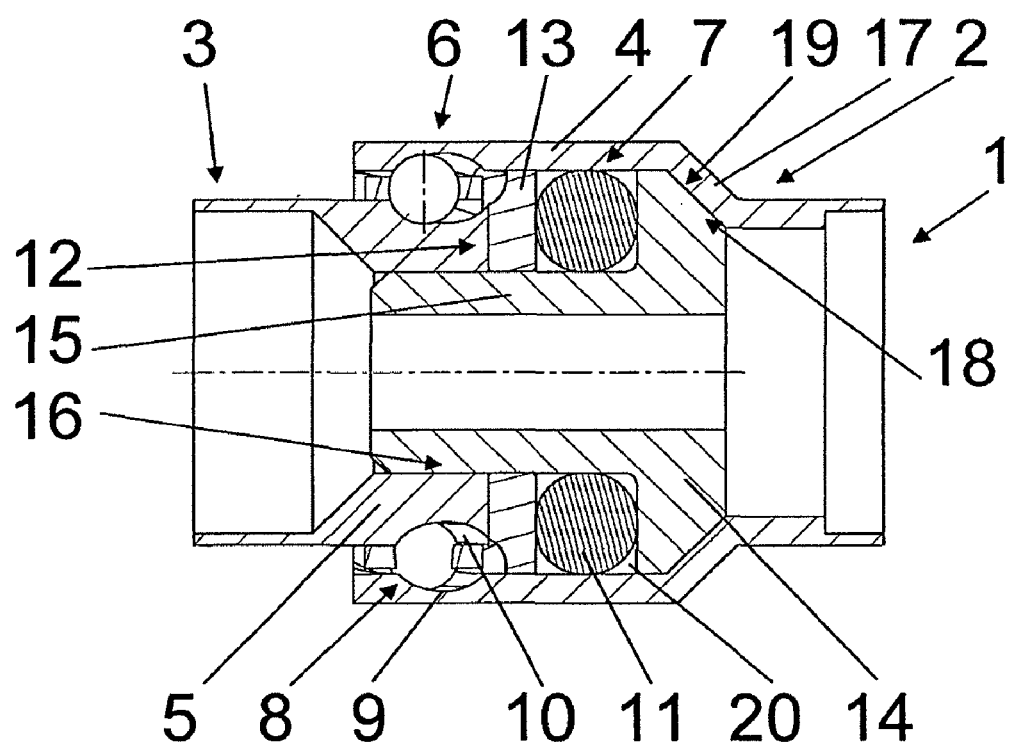
FIG. 1 shows a section of a damper unit comprising an axially elastic element made of an elastic material.

FIG. 1 shows a section of a damper unit 1 comprising a first component 2 and a second component 3 each respectively associated with drive side or a driven side of a shaft. The first component 2 comprises a sleeve-shaped molded recess 4, in which an axial projection 5 of the second component 3 engages. When stressed axially, the two components 2, 3 can rotate relative to each other along a partial thread 6, and in so doing, they compress the axially elastic element 7, which in the illustrative embodiment is made of an elastic material, for example, an elastomer such as rubber, plastic such as VITON ®, EPDM, inorganic elastomers or combinations thereof. The elastic material may be suitably reinforced, for example, by glass fibers, carbon addition and/or metal additives.

A ball-screw segment 8 that enables a low-friction rotation of the two components 2, 3 in order to compress the axially elastic element 7 is used for the partial thread 6 in the illustrative embodiment shown. For this purpose, longitudinal grooves 9, 10 having a circumferential component are disposed in the molded recess 4 and on the axial projection 5, respectively, which longitudinal grooves force a screwing motion of the two components when the components are subjected to axial load, and this screwing motion causes the axially elastic element 7 to be compressed in the axial direction. Depending on the configuration of the pitch of the longitudinal grooves 9, 10 and on the elastic properties of the axially elastic element 7, it is possible to predetermine a corresponding characteristic of the damper unit 1.

In the illustrative embodiment shown the axially elastic element 7 in the form of an annular component 11 is supported on one side against the end face 12 of the axial projection 5 by an intermediate washer 13 bearing, and on the other side by a radially expanded rim 14 of a receiving component 15. The receiving component 15 is mounted in a central opening 16 of the axial projection 5. The boundary surfaces between the inner circumference of the opening 16 and the outer circumference of the receiving component 15 can exhibit selective friction for adjusting the hysteresis of the damper unit 1. In order to prevent friction, however, the boundary surfaces are preferably provided with play, or are coated with a low-friction coating and/or lubricated and/or machined, for example, in a grinding process. The receiving component 15 is supported by the rim 14 axially against an end face 17 of the axial molded recess. The bearing surfaces or supporting surfaces 18, 19 between the rim 14 and the end face are shaped conically.

When the components 2, 3 are loaded axially relative to each other, the intermediate ring 13 slides, preferably relative to the end face 12 of the axial projection 5, so that the annular component 11 is prevented from rolling on the intermediate washer 13 and possibly being subjected to wear. For this purpose, the contact surface between the intermediate washer 13 and the end face 12 can be treated appropriately, for example, by being provided with a low-friction coating and/or lubricated and/or machined in order to prevent friction.

The annular component 11 has a substantially circular cross-section and is mounted in a preferably cylindrical working chamber 20. In its unstressed state, the annular component 11 has a smaller volume than the working chamber 20 so that when the two components 2, 3 are loaded relative to each other, for example, as a result of axial vibrations or axial impact, the annular component is initially deformed elastically and fills in the free corners, which may be rounded. In this way, a slightly rising characteristic curve is realized as the annular component is subjected to increasing load until the volume of the working chamber 20, which decreases axially as the load increases, is substantially completely filled. Thereafter, the stiffness of the annular component, and thus the characteristic curve, increases sharply so that an essentially two-stage damping performance characteristic can be achieved.

Figure 2:
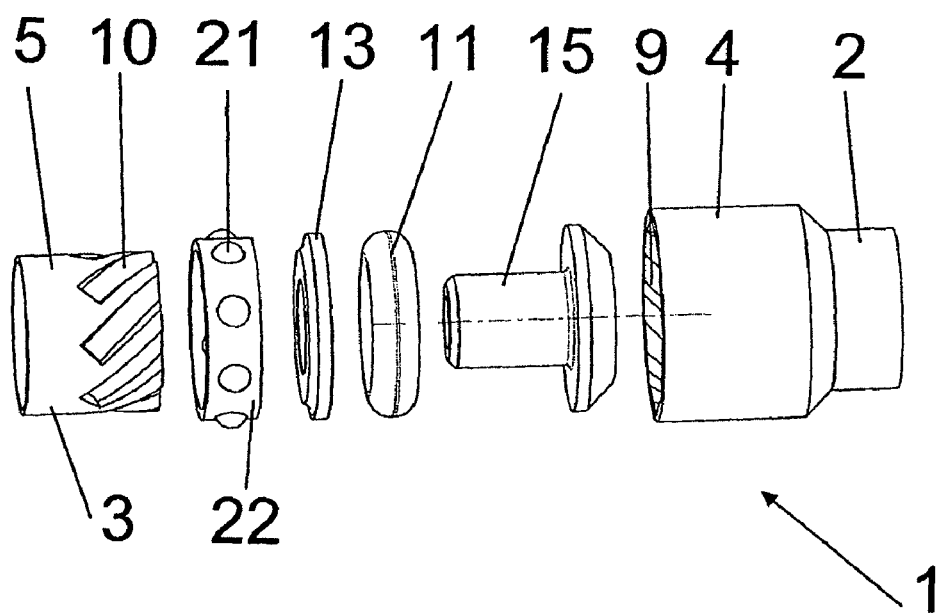
FIG. 2 is an exploded view of the damper unit of FIG. 1.

FIG. 2 is an exploded view of the damper unit 1 shown in FIG. 1 comprising the first component 2 which may be produced by a forming process, and the second component 3 which may be produced from of a pipe section. The longitudinal grooves 9, 10 are introduced, for example impressed, in the two components 2, 3. Balls 21 that are received in a ball cage 22 are guided in the longitudinal grooves 9, 10. The receiving component 15, which receives the annular component 11 and the intermediate washer 13 and then the axial projection 5 of the second component 3, is mounted in the sleeve-shaped molded recess 4.

Figure 3:
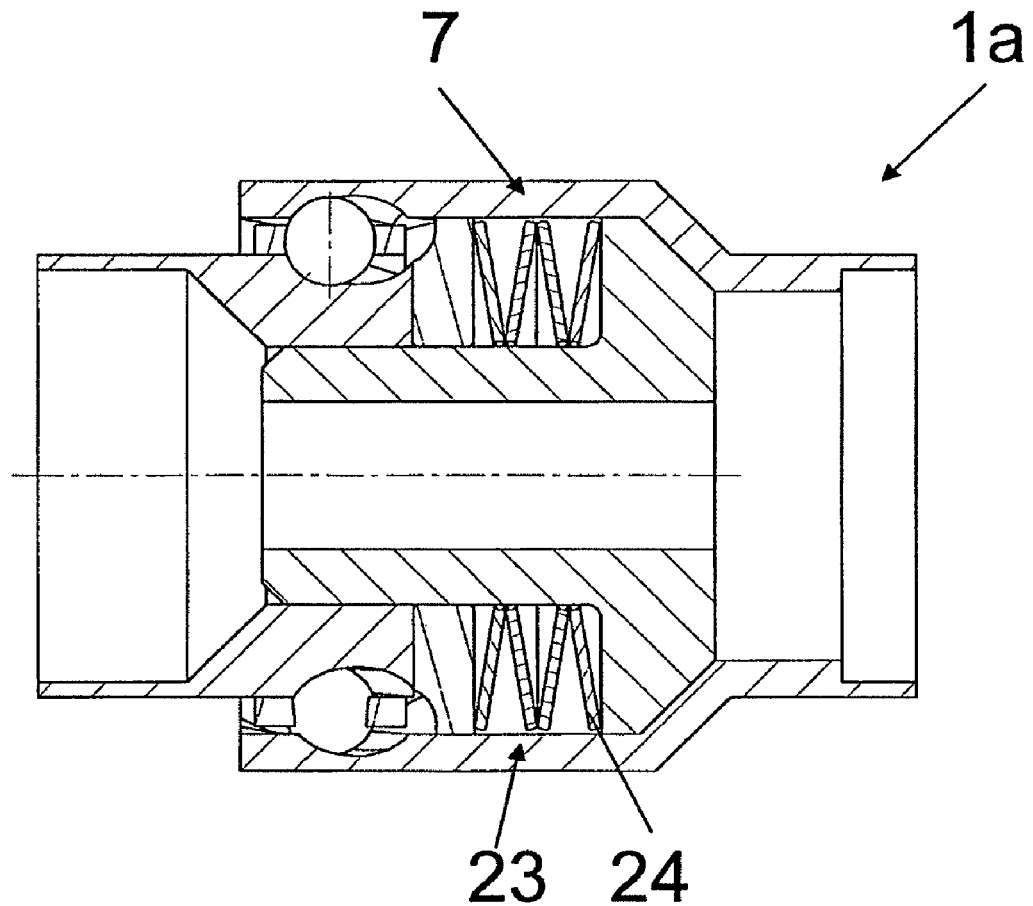
FIG. 3 is a sectional view of an alternative embodiment of a damper unit, which comprises an axially elastic element in the form of a diaphragm-spring set.

FIG. 3 shows an illustrative embodiment of a damper unit 1a that is slightly modified as compared to the damper unit 1 shown in FIG. 1. In this case, the axially elastic element 7 is formed by a diaphragm-spring set 23 comprising an arrangement of individual diaphragm springs 24. The diaphragm-spring set 23 can be adapted by variable selection of the stiffness of the diaphragm springs 24 and a variable number of diaphragm springs 24 in order to realize the desired multistage characteristics of the damper unit 1 a. Diaphragm springs 24 that are completely compressed can be provided to obtain a characteristic curve having a particularly steep gradient.

Figure 4:
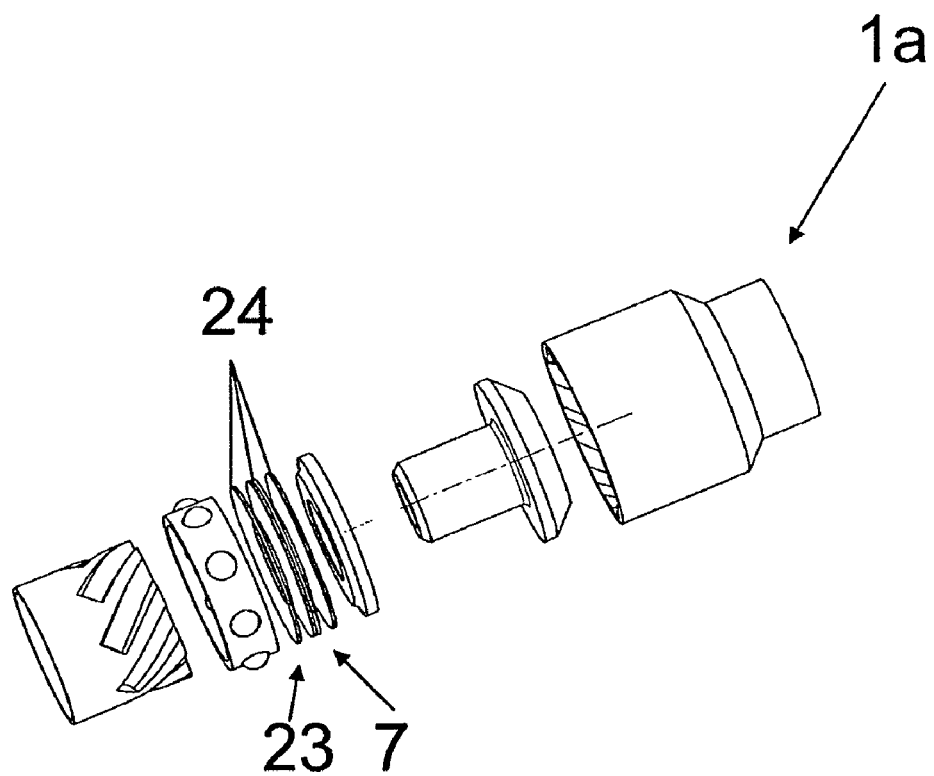
FIG. 4 is an exploded view of the damper unit of FIG. 3.

FIG. 4 is an exploded view of the damper unit 1a shown in FIG. 3 comprising an axially elastic element 7 that is modified as compared to the exploded view of the damper unit 1 shown in FIG. 2 and that is equipped with individual diaphragm springs 24 that form the diaphragm-spring set 23.

Figure 5:
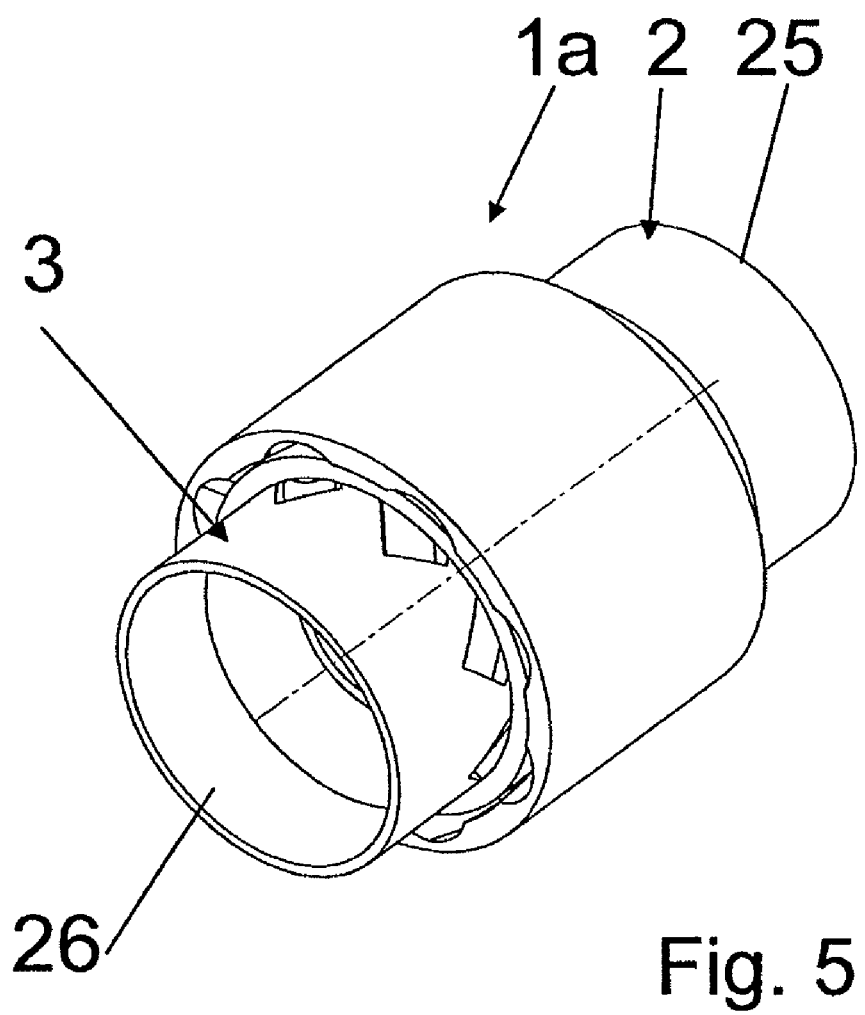
FIG. 5 is an exterior view of the damper units of FIGS. 1 to 4.

FIG. 5 is an exterior view of the damper unit 1a that is identical to the exterior view of the damper unit 1. For connection to a shaft (not shown) or a shaft member, the two components 2, 3 each comprise a sleeve-shaped flange 25, 26, with which the shaft forms a positive interlock. For this purpose, the respective shaft or the corresponding shaft section can be joined to the flange, welded, screwed to the same or attached thereto in some other manner. The outer diameter of the damper units 1, 1a can be kept small due to the smaller dimensions assumed by the axially elastic element 7 (FIGS. 1 and 3) as a result of the axial loading thereof and the transfer of torque via the longitudinal grooves 9, 10 and the balls 21 so that the outer diameter of the damper is only slightly larger than the diameter of the shafts to be received in the flanges 25, 26.

Figure 6:
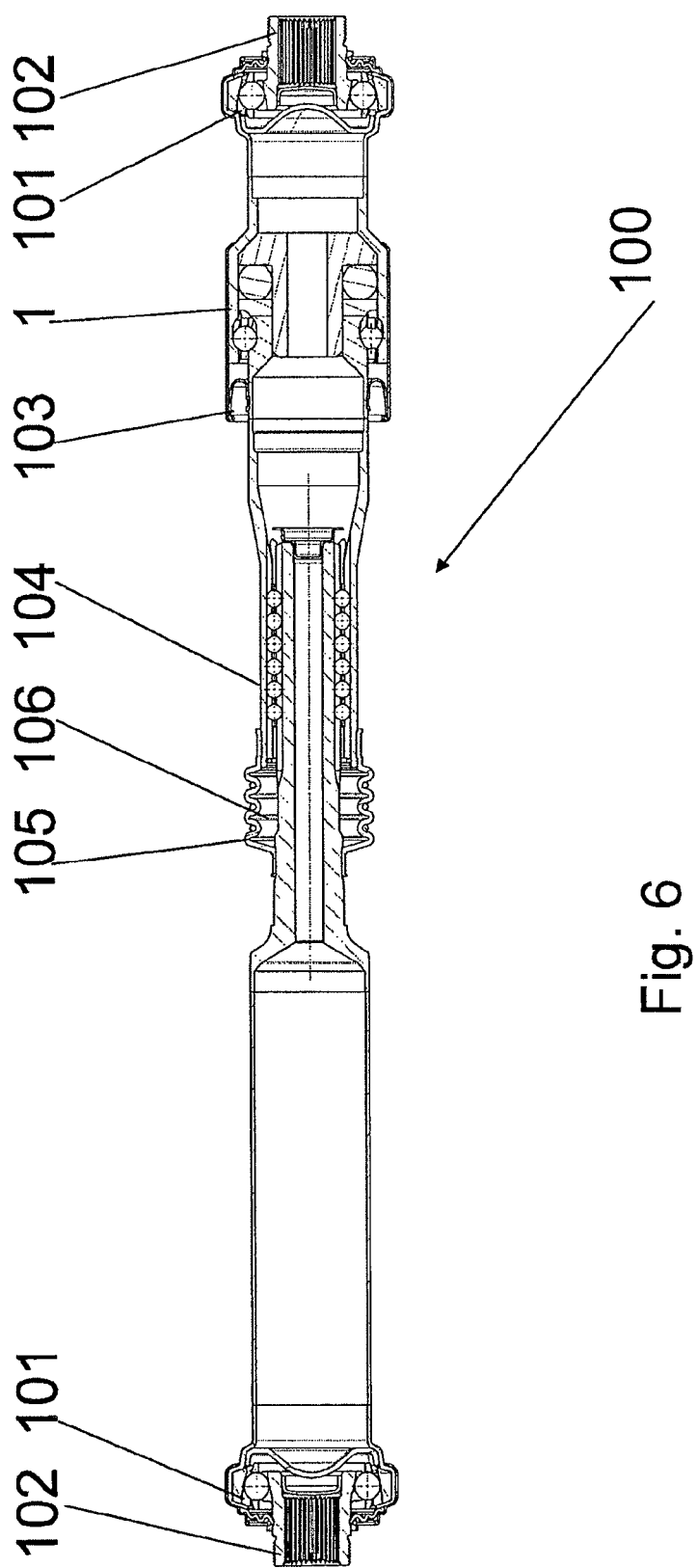
FIG. 6 is a sectional view of a jointed shaft comprising a damper unit according to the invention.

FIG. 6 shows a jointed shaft 100—more particularly, a drive shaft—which comprises a damper unit 1 of the invention. Two articulated joints 101 comprising internal teeth 102 for connection to additional vehicle components are provided on the sides of the jointed shaft. The damper unit 1 is sealed by roll bellows 103 on the side, at which a shaft section extends into the damper unit in the form of an inner hub. This shaft section—the central shaft section in the drawing—also has a displacement unit 104, which is provided here, for example, for assembly or crash purposes. Alternatively, an additional displacement unit 104 is not provided in the case of a damper unit 1 that also enables an axial displacement. If a displacement unit 104 is provided, expansion bellows 105 comprising reinforcing rings 106 are provided in this embodiment for the purpose of sealing. Both seals 103, 105 can also be of identical construction.

One or more jointed shafts 100 having the construction shown here or a modified construction can be installed in a multi-part shaft. Installation of multiple jointed shafts is possible, for example, in a two-part shaft with a center bearing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents.

The invention claimed is:

1. A damper unit comprising:
   two components connected to each other for co-rotation, the two components being axially displaceable at least to a limited extent relative to each other, and
   an axially elastic element disposed between the two components;
   wherein:
   the two components are connected by a thread connection such that application of an axial load to the components produces a rotational movement of the two components relative to each other and a consequent axial displacement of the two components toward each other whereby the elastic element is compressed;
   a first of the two components comprises a sleeve-shaped molded recess in which the axially elastic element is received and in which an axial projection on the second of the two components is engaged;
   the thread connection comprises a partial thread provided between the projection and the molded recess; and
   the partial thread is constructed as a ball-screw segment which comprises:
   longitudinal grooves having a circumferential component provided in the axial projection and in the sleeve-shaped molded recess, respectively, so as to form pairs of mutually opposing grooves distributed around the circumference of the projection and recess,
   at least one ball mounted in each of the pairs of mutually opposing longitudinal grooves, the at least one ball mounted in each of the pairs of mutually opposing longitudinal grooves balls are retained in a ball cage, and the axial projection comprises a central opening, in which a receiving component comprising a radially expanded rim is mounted, the axially elastic element being received between an end face of the axial projection and the rim, and the rim being supported axially against an end face of the sleeve-shaped molded recess.

2. The damper unit as claimed in claim 1, wherein the partial thread has a pitch that is smaller than one.

3. The damper unit as claimed in claim 2, wherein the partial thread has a pitch that is smaller than a quarter of the circumference.

4. The damper unit as claimed in claim 1, wherein an intermediate washer is disposed axially between the end face of the axial projection and the axially elastic element.

5. The damper unit as claimed in claim 1, wherein the axially elastic element is disposed in a pre-stressed state between the two components.

6. The damper unit as claimed in claim 1, wherein at least one of the components is connected to a shaft.

7. The damper unit as claimed in claim 6, wherein the damper unit has a diameter smaller than twice the diameter of the shaft.

8. The damper unit as claimed in claim 7, wherein the damper unit has a diameter smaller than one and a half times the diameter of a shaft provided with the damper unit.

9. A jointed shaft which comprises at least one axially elastic element and/or a damper unit as claimed in claim 1.

10. A jointed shaft as claimed in claim 9, wherein said jointed shaft is a longitudinal drive shaft or a lateral drive shaft in a drive train of a motor vehicle.

11. A damper unit on a shaft of a drive train of a motor vehicle, comprising:

two components connected to each other for co-rotation, the two components being axially displaceable at least to a limited extent relative to each other, and an axially elastic element disposed between the two components;

wherein:

the two components are connected by a thread connection such that application of an axial load to the components produces a rotational movement of the two components relative to each other and a consequent axial displacement of the two components toward each other whereby the elastic element is compressed;

a first of the two components comprises a sleeve-shaped molded recess in which the axially elastic element is received and in which an axial projection on the second of the two components is engaged;

the thread connection comprises a partial thread provided between the projection and the molded recess; and the partial thread is constructed as a ball-screw segment which comprises:

longitudinal grooves having a circumferential component provided in the axial projection and in the sleeve-shaped molded recess, respectively, so as to form pairs of mutually opposing grooves distributed around the circumference of the projection and recess, at least one ball mounted in each of the pairs of mutually opposing longitudinal grooves, the at least one ball mounted in each of the pairs of mutually opposing longitudinal grooves balls are retained in a ball cage, and the axial projection comprises a central opening, in which a receiving component comprising a radially expanded rim is mounted, the axially elastic element being received between an end face of the axial projection and the rim, and the rim being supported axially against an end face of the sleeve-shaped molded recess.

* * * * *